(12) United States Patent
O'Hara et al.

(10) Patent No.: US 7,670,704 B2
(45) Date of Patent: Mar. 2, 2010

(54) UNTREATED DIFFUSION MEDIA WITH MESOPOROUS LAYER AND DEVICES INCORPORATING THE SAME

(75) Inventors: Jeanette E. O'Hara, Rochester, NY (US); Joerg Roth, Trubur (DE); Han Liu, Waltham, MA (US)

(73) Assignee: GM Global Technology Operations, Inc., Detroit, MI (US)

( * ) Notice: Subject to any disclaimer, the term of this patent is extended or adjusted under 35 U.S.C. 154(b) by 742 days.

(21) Appl. No.: 11/255,734

(22) Filed: Oct. 21, 2005

(65) Prior Publication Data

US 2006/0035017 A1 Feb. 16, 2006

Related U.S. Application Data

(62) Division of application No. 10/628,856, filed on Jul. 28, 2003, now Pat. No. 6,967,039.

(51) Int. Cl.
*H01M 8/10* (2006.01)
(52) U.S. Cl. .............................. 429/30; 429/34; 429/40; 429/41; 429/42; 429/44
(58) Field of Classification Search .................. 442/79, 442/110, 111; 429/34, 129, 30, 40, 41, 42, 429/44
See application file for complete search history.

(56) References Cited

U.S. PATENT DOCUMENTS

| | | | |
|---|---|---|---|
| 3,238,068 A | 3/1966 | Hipp | |
| 3,960,601 A * | 6/1976 | Schulz | ........................ 429/212 |
| 4,175,055 A | 11/1979 | Goller et al. | |
| 4,362,790 A | 12/1982 | Blanchart et al. | |
| 4,405,544 A | 9/1983 | Solomon | |

(Continued)

FOREIGN PATENT DOCUMENTS

EP 0 051 438 A1 5/1982

(Continued)

OTHER PUBLICATIONS

Regan, Christopher; Mesoporous Structures; Apr. 8, 2002 http://www.rpl.edu/locker/25/00_1225_public_html/nano_02/cregan/regan/mesoporous.html.

(Continued)

*Primary Examiner*—Andrew T Piziali
(74) *Attorney, Agent, or Firm*—Dinsmore & Shohl LLP

(57) ABSTRACT

A diffusion media and a process for its fabrication are provided for addressing issues related to water management in electrochemical cells and other devices employing the diffusion media. In accordance with one embodiment of the present invention, a process for fabricating a diffusion media is provided. A diffusion media substrate is provided comprising a porous fibrous matrix defining first and second major faces. The substrate comprises an amount of carbonaceous material sufficient to render the substrate electrically conductive. A mesoporous layer is applied along at least a portion of one of the first and second major faces of the substrate. The mesoporous layer is applied to the substrate by providing a coating comprising a hydrophobic component, a hydrophilic component, and a pore forming agent. The substrate is free of fluorinated polymers outside of regions of the substrate carrying the mesoporous layer. The pore forming agent is decomposed such that the mesoporous layer is more porous than the diffusion media substrate.

9 Claims, 2 Drawing Sheets

U.S. PATENT DOCUMENTS

| | | | |
|---|---|---|---|
| 4,468,362 A | | 8/1984 | Solomon |
| 4,536,272 A | | 8/1985 | Blanchart et al. |
| 4,659,528 A | | 4/1987 | Plowman et al. |
| 4,865,925 A | * | 9/1989 | Ludwig et al. ................ 429/12 |
| 4,931,168 A | * | 6/1990 | Watanabe et al. ........... 204/284 |
| 5,185,218 A | * | 2/1993 | Brokman et al. .............. 429/27 |
| 5,350,643 A | | 9/1994 | Imahashi et al. |
| 5,500,292 A | * | 3/1996 | Muranaka et al. .......... 429/209 |
| 5,626,905 A | | 5/1997 | Bachot et al. |
| 5,840,438 A | | 11/1998 | Johnson et al. |
| 5,935,643 A | | 8/1999 | Song et al. |
| 5,952,119 A | | 9/1999 | Wilson |
| 5,998,058 A | | 12/1999 | Fredley |
| 6,127,059 A | | 10/2000 | Kato |
| 6,194,094 B1 | | 2/2001 | Sugawara et al. |
| 6,280,870 B1 | | 8/2001 | Eisman et al. |
| 6,280,872 B1 | | 8/2001 | Ozaki et al. |
| 6,303,245 B1 | | 10/2001 | Nelson |
| 6,350,539 B1 | | 2/2002 | Wood, III et al. |
| 6,365,293 B1 | | 4/2002 | Isono et al. |
| 6,368,476 B1 | | 4/2002 | DeMarinis et al. |
| 6,413,664 B1 | | 7/2002 | Wilkinson et al. |
| 6,444,347 B1 | | 9/2002 | Ouvry et al. |
| 7,060,384 B2 | | 6/2006 | Yoshida et al. |
| 2002/0142205 A1 | | 10/2002 | Kim et al. |
| 2002/0142210 A1 | | 10/2002 | Kaiser et al. |
| 2005/0084742 A1 | | 4/2005 | Angelopoulos et al. |

FOREIGN PATENT DOCUMENTS

| | | |
|---|---|---|
| EP | 0 126 511 | 11/1984 |
| EP | 0 292 431 | 11/1988 |
| EP | 0 846 347 B1 | 6/2000 |
| FR | 2 413 796 | 7/1979 |
| GB | 2012100 | 7/1979 |
| JP | 54099947 A | 8/1979 |
| JP | 57104678 A | 6/1982 |
| JP | 62-226583 | 10/1987 |
| JP | 2001216973 A | 8/2001 |
| JP | 2002313350 A | 10/2002 |
| JP | 2003173789 A | 6/2003 |
| WO | 1 239 528 | 9/2002 |

OTHER PUBLICATIONS

Han et al; Simple Silica-Particle Template synthesis of Mesoporous Carbons, Chem. Commun., 1999, p. 1955.

Japanese Office Action dated Sep. 17, 2009 pertaining to Japanese application No. 2006-521820.

* cited by examiner

UNTREATED DIFFUSION MEDIA WITH MESOPOROUS LAYER AND DEVICES INCORPORATING THE SAME

CROSS-REFERENCE TO RELATED APPLICATIONS

This is a division of application Ser No. 10/628,856 filed on Jul. 28, 2003, now U.S. Pat. No. 6,967,039.

BACKGROUND OF THE INVENTION

The present invention relates to the design and manufacture of diffusion media and, more particularly, to diffusion media for use in electrochemical cells where water management is a significant design issue.

BRIEF SUMMARY OF THE INVENTION

According to the present invention, a diffusion media and a process for its fabrication are provided for addressing issues related to water management in electrochemical cells and other devices employing the diffusion media. In accordance with one embodiment of the present invention, a process for fabricating a diffusion media is provided. A diffusion media substrate is provided comprising a porous fibrous matrix defining first and second major faces. The substrate comprises an amount of carbonaceous material sufficient to render the substrate electrically conductive. A mesoporous layer is applied along at least a portion of one of the first and second major faces of the substrate. The mesoporous layer is applied to the substrate by providing a coating comprising a hydrophobic component, a hydrophilic component, and a pore forming agent. The substrate is free of fluorinated polymers outside of regions of the substrate carrying the mesoporous layer. The pore forming agent is decomposed such that the mesoporous layer is more porous than the diffusion media substrate.

In accordance with another embodiment of the present invention, a process for fabricating a diffusion media is provided. According to the process, the mesoporous layer is applied to the substrate by providing a coating comprising a hydrophobic component, a hydrophilic component, a pore forming agent, and a solvent. The hydrophobic component comprises a fluorinated polymer. The hydrophilic component comprises a carbonaceous substance selected from carbon fibers, carbon particles, and combinations thereof. The carbonaceous substance is characterized by a surface area of about 60 m²/g. The pore forming agent comprises ammonium carbonate. The substrate is free of fluorinated polymers outside of regions of the substrate carrying the mesoporous layer. A sufficient amount of the mesoporous layer is applied to the substrate to substantially increase a porosity of the diffusion media relative to the diffusion media absent the mesoporous layer. The substantial increase in the porosity of the diffusion media is between about 5% and about 15%. The solvent is selected from $H_2O$, isopropanol, and combinations thereof. The coating is provided such that it at least partially infiltrates the diffusion media substrate. The pore forming agent is decomposed in a heat-treating process such that the mesoporous layer is more porous than the diffusion media substrate.

In accordance with yet another embodiment of the present invention, a device comprising a diffusion media is provided wherein the diffusion media comprises a diffusion media substrate and a mesoporous layer. The diffusion media substrate comprises a porous fibrous matrix defining first and second major faces and an amount of carbonaceous material sufficient to render the substrate electrically conductive. The diffusion media substrate carries the mesoporous layer along at least a portion of one of the first and second major faces of the substrate. The mesoporous layer comprises hydrophobic and hydrophilic components defining hydrophobic and hydrophilic regions within the mesoporous layer. The mesoporous layer comprises an amount of carbonaceous material sufficient to render the mesoporous layer electrically conductive. The mesoporous layer is characterized by a porosity greater than a porosity of the diffusion media substrate. The diffusion media substrate is free of fluorinated polymers outside of regions of the substrate carrying the mesoporous layer.

Accordingly, it is an object of the present invention to provide a means for addressing water management issues in diffusion media and devices employing such diffusion media. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
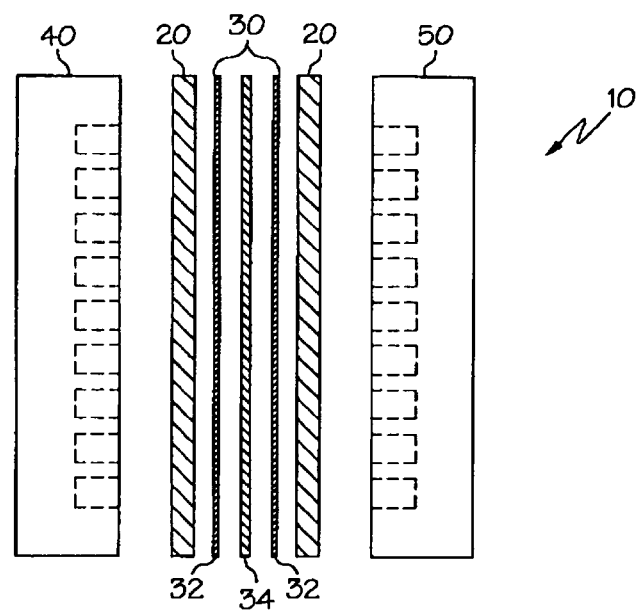
FIG. 1 is a schematic illustration of a fuel cell incorporating a porous diffusion media according to the present invention.

Referring initially to FIG. 1 a fuel cell 10 incorporating a porous diffusion media 20 according to the present invention is illustrated. Specifically, the fuel cell 10 comprises a membrane electrode assembly 30 interposed between an anode flow field 40 and a cathode flow field 50 of the fuel cell 10. It is contemplated that the flow fields 40, 50 and the membrane electrode assembly 30 may take a variety of conventional or yet to be developed forms without departing from the scope of the present invention. Although the particular form of the membrane electrode assembly 30 is beyond the scope of the present invention, in the illustrated embodiment, the membrane electrode assembly 30 includes respective catalytic electrode layers 32 and an ion exchange membrane 34.

Figure 2:
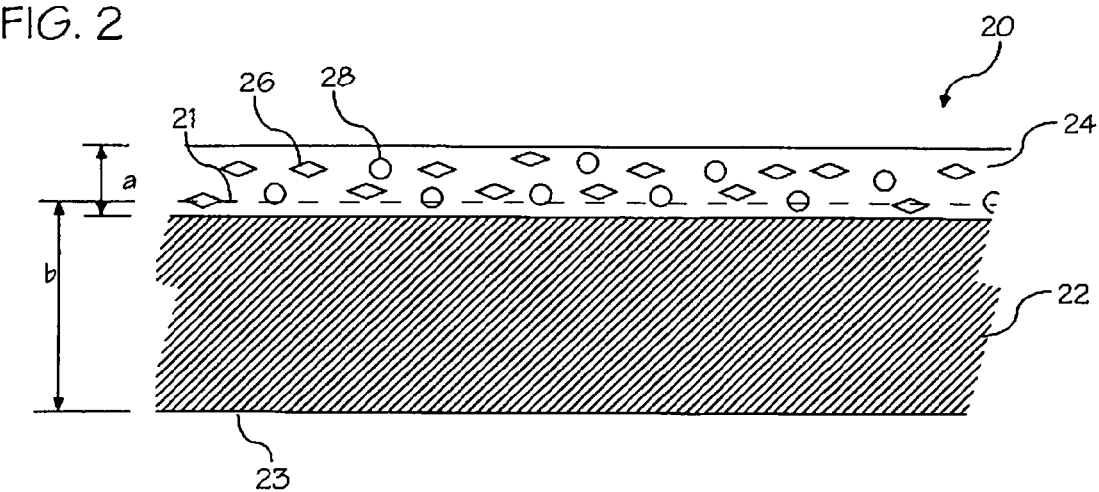
FIG. 2 is a schematic illustration of a porous diffusion media according to one embodiment of the present invention.

Referring now to FIG. 2, a diffusion media 20 according to one embodiment of the present invention is illustrated schematically. The diffusion media 20 comprises a diffusion media substrate 22 and a mesoporous layer 24. The diffusion media substrate 22 comprises a porous fibrous matrix defining first and second major faces 21, 23 and an amount of carbonaceous material sufficient to render the substrate 22 electrically conductive. In the illustrated embodiment, the diffusion media substrate 22 carries the mesoporous layer 24 along the first major face 21 of the substrate 22.

In many embodiments of the present invention the mesoporous layer 24 is more effective in addressing water management issues if it is positioned against the membrane electrode assembly 30 of the fuel cell 10, as opposed to being positioned to face the flow field of the cell. Nevertheless, it is contemplated that the diffusion media substrate 22 may carry the mesoporous layer 24 along either major face 21, 23 of the substrate 22 regardless of which face is positioned against the membrane electrode assembly 30. Further, the mesoporous layer 24 may cover all or a portion of the face along which it is carried.

The mesoporous layer 24 is typically more porous than the diffusion media substrate 22. For the purposes of defining and describing the present invention, it is noted that mesoporous structures are characterized by pore sizes that can range from a few nanometers to hundreds of nanometers. The mesoporous layer 24 comprises a hydrophobic component 26 and a hydrophilic component 28 defining hydrophobic and hydrophilic regions in the layer 24. The hydrophobic component 26 may comprise a fluorinated polymer, e.g., polytetrafluoroethylene (PTFE), polyvinylidene fluoride (PVDF), polyvinyl fluoride (PVF), a combination of fluorinated polymers, or any other suitable hydrophobic material or combination of materials. The hydrophilic component 28 may be presented as a carbonaceous substance like carbon fibers, carbon particles, and combinations thereof, but may alternatively be presented by any other suitable hydrophilic material. By way of illustration and not limitation, it is noted that carbonaceous substances like acetylene black, characterized by surface areas of about 60 m2/g are suitable hydrophilic materials for the mesoporous layer 24. The mesoporous layer 24 also comprises an amount of carbonaceous material sufficient to render it electrically conductive. Although the hydrophilic or hydrophobic components 28 already present in the layer 24 may be selected to fill this role, it is contemplated that additional components may be incorporated into the layer to render it electrically conductive.

As is illustrated in FIG. 2, the mesoporous layer 24 at least partially infiltrates the diffusion media substrate 22. The extent of infiltration, illustrated schematically by showing the first surface 21 in phantom in FIG. 2, will vary widely depending upon the properties of the mesoporous layer 24 and the diffusion media substrate 22.

The diffusion media substrate 22 is untreated in the sense that it is free of fluorinated polymers. Of course, in embodiments where the mesoporous layer 24 includes fluorinated polymers, it is noted that the diffusion media substrate 22 would be free of fluorinated polymers outside of any regions of the substrate 22 carrying the mesoporous layer 24.

Figure 3:
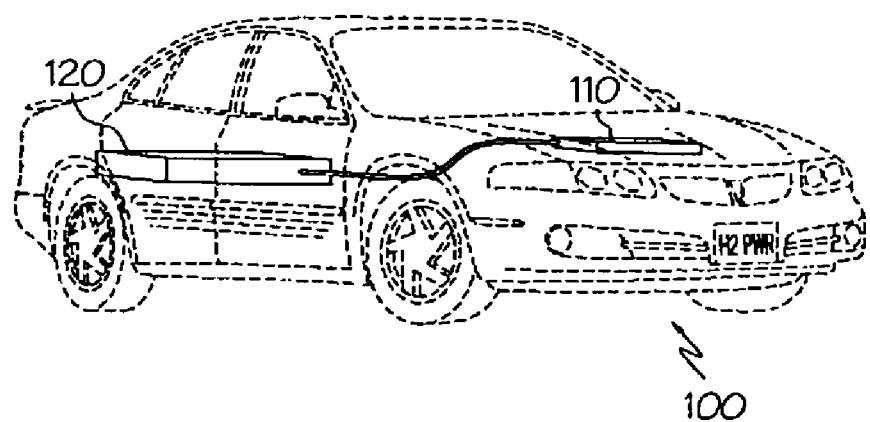
FIG. 3 is a schematic illustration of a vehicle incorporating a fuel cell according to the present invention.

Referring now to FIG. 3, a fuel cell system incorporating diffusion media according to the present invention may be configured to operate as a source of power for a vehicle 100. Specifically, fuel from a fuel storage unit 120 may be directed to the fuel cell assembly 110 configured to convert fuel, e.g., H2, into electricity. The electricity generated is subsequently used as a motive power supply for the vehicle 100 where the electricity is converted to torque and vehicular translational motion.

Referring now to the process by which diffusion media of the present invention may be fabricated, the mesoporous layer is applied to the substrate by providing a coating comprising the hydrophobic component, the hydrophilic component, a pore forming agent, and suitable solvents. The pore forming agent is subsequently decomposed such that the mesoporous layer is more porous than the diffusion media substrate. The solvent may be any suitable solvent including, but not limited to de-ionized $H_2O$, isopropanol, and combinations thereof.

Generally, the coating is provided as a mixture comprising between about 15 wt % and about 40 wt % of the hydrophobic component, between about 85 wt % and about 60 wt % of the hydrophilic component, and between about 0 wt % and about 15 wt % of the pore forming agent. More specifically, the coating is provided as a mixture comprising slightly less than about 20 wt % of the hydrophobic component, slightly less than about 80 wt % of the hydrophilic component, and about 5 wt % of the pore forming agent.

Where the hydrophilic component comprises a carbonaceous substance, the substance may be selected from a variety of materials including, but not limited to, carbon fibers, carbon particles, and combinations thereof. The carbonaceous substance may be characterized by a surface area of between about 50 $m^2/g$ and about 250 $m^2/g$. More specifically, and by way of illustration and not limitation, suitable hydrophilic components, like acetylene black, are characterized by surface areas of about 60 $m^2/g$.

Regarding the pore forming agent, it should comprise a material that tends to substantially increase the pore size of the mesoporous layer as it is applied to the substrate and allowed to cure, dry, harden, or otherwise stabilize. For example and by way of illustration and not limitation, the pore forming agent may comprise ammonium carbonate or any other material selected to decompose in a mixture with the hydrophobic and hydrophilic components upon heating. The decomposition may be particulate free and may comprise gaseous and liquid components. More specifically, the pore forming agent may comprise a material selected such that the mesoporous layer will be substantially free of the components of the pore forming agent upon decomposition of the pore forming agent. Pore forming agents that decompose into gaseous products and water are suitable for many applications of the present invention. For example, products of the thermal decomposition of ammonium carbonate include ammonia, carbon dioxide, nitrogen, and water vapor.

The decomposition of the pore forming agent may be facilitated by heating the coated substrate. Suitable heat treatment temperatures will vary depending upon the composition of the mesoporous layer. For example, where ammonium carbonate is utilized as the pore forming agent, the coated media should be heated to at least about 100° C. to encourage vaporization of water upon decomposition of the ammonium carbonate. Generally, the heat treating process is characterized by temperatures between about 75° C. and about 100° C. or at least above about 65° C.

Regarding the increase in porosity of the diffusion media with the mesoporous layer relative to the diffusion media absent the mesoporous layer, although a wide range in increases are contemplated, increases in the porosity of the diffusion media of between about 5% and about 15% or, more specifically, of about 7.5% are typical for many embodiments of the present invention. By way of illustration and not limitation, according to one embodiment of the present invention the porosity of a diffusion media including a 250 µm thick carbon fiber paper substrate and a 10 µm thick mesoporous layer of acetylene black and PTFE is increased from about 78% (absent the mesoporous layer) to about 84% (including the mesoporous layer).

Regarding the respective thicknesses a, b of the diffusion media substrate 22 and the mesoporous layer 24 illustrated in FIG. 2, it is noted that suitable values will vary depending upon the particular application in which the diffusion media is employed. For example, it is contemplated that carbon fiber paper products having thicknesses b of between about 100 µm and about 300 µm will be suitable for use in the present invention with mesoporous layer thicknesses a of between about 10 µm and about 25 µm.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise a diffusion media, a fuel cell incorporating a diffusion media according to the present invention, a vehicle incorporating a fuel cell according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A polymer electrolyte membrane fuel cell comprising:
    a membrane electrode assembly comprising an ion exchange membrane disposed between a pair of catalytic electrode layers;
    first and second electrically conductive diffusion media formed as a layer wherein said first diffusion media is in fluid and electrical communication with a first of said catalytic electrode layers and said second diffusion media is in fluid and electrical communication with a second of said catalytic electrode layers; and
    an anode flow field in fluid communication with one of said first and second diffusion media layers and a cathode flow field in fluid communication with the other of said first and second diffusion media layers, wherein:
    said first or second diffusion media layers or both comprises a diffusion media substrate and a mesoporous layer;
    said first or second diffusion media substrate comprises a porous fibrous matrix defining first and second major faces comprising an electrically conductive carbonaceous material;
    said first or second diffusion media substrate carries said mesoporous layer along at least a portion of one of said first and second major faces of said substrate;
    said first or second mesoporous layer comprises hydrophobic and hydrophilic components defining hydrophobic and hydrophilic regions within said mesoporous layer;
    said first or second mesoporous layer comprises an electrically conductive carbonaceous material;
    said first or second mesoporous layer is characterized by a porosity greater than a porosity of said first or second diffusion media substrate; and
    said first or second diffusion media substrate is free of fluorinated polymers outside of said portion of one of said first and second major faces of said substrate carrying said mesoporous layer;
    wherein said first or second mesoporous layer is characterized by pore sizes between 1 nm and 1 µm.

2. A device as claimed in claim 1 wherein:
    said hydrophobic component comprises a fluorinated polymer;
    said hydrophilic component comprises a carbonaceous substance selected from carbon fibers, carbon particles, and combinations thereof;
    said carbonaceous substance is characterized by a surface area of about 60 m2/g;
    said mesoporous layer at least partially infiltrates said diffusion media substrate;
    said diffusion media substrate is characterized by a porosity of about 78% outside regions of said substrate carrying said mesoporous layer; and
    said diffusion media is characterized by an overall porosity of about 84%.

3. A polymer electrolyte membrane fuel cell as claimed in claim 1 wherein said fuel cell is incorporated in a vehicle powered by said fuel cell.

4. The polymer electrolyte membrane fuel cell of claim 1 wherein said hydrophobic component comprises a fluorinated polymer.

5. The polymer electrolyte membrane fuel cell of claim 1 wherein said hydrophilic component comprises a carbonaceous substance selected from carbon fibers, carbon particles, and combinations thereof.

6. The polymer electrolyte membrane fuel cell of claim 1 wherein said first or second mesoporous layer at least partially infiltrates said first or second diffusion media substrate.

7. The polymer electrolyte membrane fuel cell of claim 1 wherein said first or second diffusion media substrate is characterized by a porosity of about 78% outside said portion of said first or second diffusion media substrate carrying said first or second mesoporous layer.

8. The polymer electrolyte membrane fuel cell of claim 1 wherein said first or second diffusion media is characterized by an overall porosity of about 84%.

9. The polymer electrolyte membrane fuel cell of claim 1 wherein:
    said hydrophobic component comprises a fluorinated polymer;
    said hydrophilic component comprises a carbonaceous substance selected from carbon fibers, carbon particles, and combinations thereof;
    said first or second mesoporous layer at least partially infiltrates said first or second diffusion media substrate;
    said first or second diffusion media substrate is characterized by a porosity of about 78% said portion of said first or second diffusion media substrate carrying said first or second mesoporous layer; and
    said first or second diffusion media is characterized by an overall porosity of about 84%.

* * * * *